(12) United States Patent
Chandler et al.

(10) Patent No.: US 8,630,601 B2
(45) Date of Patent: Jan. 14, 2014

(54) ACTIVE CHANNELIZED INTEGRATED ANTENNA SYSTEM

(75) Inventors: Charles Chandler, Goleta, CA (US); Roger A. Conrad, Rancho Palos Verdes, CA (US); Robert A. Deaton, Ventura, CA (US)

(73) Assignee: Raytheon Company, Waltham, MA (US)

( * ) Notice: Subject to any disclaimer, the term of this patent is extended or adjusted under 35 U.S.C. 154(b) by 534 days.

(21) Appl. No.: 12/384,490

(22) Filed: Apr. 6, 2009

(65) Prior Publication Data

US 2010/0255805 A1 Oct. 7, 2010

(51) Int. Cl.
 H04B 1/06 (2006.01)
 H04B 3/36 (2006.01)
 H04B 7/185 (2006.01)

(52) U.S. Cl.
 USPC .............. 455/272; 455/7; 455/13.3; 455/273; 455/275; 455/277.1; 375/214

(58) Field of Classification Search
 USPC ........... 455/7, 13.3, 22, 272, 273, 275, 277.1; 375/214
 See application file for complete search history.

(56) References Cited

U.S. PATENT DOCUMENTS

| | | | | |
|---|---|---|---|---|
| 3,272,996 A | * | 9/1966 | Pan ................................ | 327/320 |
| 3,283,249 A | | 11/1966 | Mitchell | |
| 4,214,316 A | * | 7/1980 | Lipsky ........................... | 455/141 |
| 5,313,216 A | * | 5/1994 | Wang et al. ............. | 343/700 MS |
| 5,640,694 A | * | 6/1997 | Milton, Jr. ..................... | 455/133 |
| 6,032,020 A | * | 2/2000 | Cook et al. ......................... | 455/7 |
| 6,408,164 B1 | * | 6/2002 | Lazaris-Brunner et al. . | 455/12.1 |
| 6,727,851 B2 | | 4/2004 | Bass et al. | |
| 7,071,872 B2 | | 7/2006 | Guy | |
| 7,437,128 B1 | * | 10/2008 | Fessler et al. .............. | 455/67.13 |
| 7,852,146 B2 | * | 12/2010 | Hisayasu et al. .............. | 327/553 |

* cited by examiner

*Primary Examiner* — Lincoln Donovan
*Assistant Examiner* — Colleen O Toole
(74) *Attorney, Agent, or Firm* — Christie, Parker & Hale, LLP (57) ABSTRACT

An active channelized antenna system includes an antenna array operable over a multi-octave frequency band to provide one or more antenna output signals. An electronics module includes multiplexer circuitry responsive to the one or more antenna output signals configured to divide an input signal spectrum into a plurality of frequency band components each of less than an octave bandwidth. The electronics module includes a plurality of amplifiers each of less than an octave bandwidth to provide an amplified component signal for a respective frequency band. Combiner circuitry included with the electronics module is configured to combine the amplified frequency band components into a composite signal. A transmission medium such as a coaxial cable, fiber optic line or free space, is configured to transmit the composite signal to a remotely located receiver system. The antenna system may be employed as a repeater system.

10 Claims, 14 Drawing Sheets

ACTIVE CHANNELIZED INTEGRATED ANTENNA SYSTEM

BACKGROUND

Some military aircraft may have broadband electronic warfare (EW) antennas mounted on the wingtips and rear vertical stabilizers, connected to a host receiver with long coaxial cables. The cable losses typically vary as a function of frequency, and add directly to the host receiver noise figure. The EW antennas are typically integrated within a radome/housing and do not maximize available aperture area. To compensate for cable losses broadband amplifiers can be inserted near the antenna. Typical broadband amplifiers with high input signal levels introduce harmonics and inter-modulation products that could be interpreted as a real signal.

SUMMARY OF THE DISCLOSURE

An exemplary embodiment of an active channelized antenna system includes an antenna array operable over a multi-octave frequency band to provide one or more antenna output signals. An electronics module includes multiplexer circuitry responsive to the one or more antenna output signals configured to divide an input signal spectrum into a plurality of frequency band components each of less than an octave bandwidth. The electronics module includes a plurality of low-noise amplifiers each of less than an octave bandwidth to provide an amplified component signal for a respective frequency band. Combiner circuitry included with the electronics module is configured to combine the amplified frequency band components into a composite signal. A transmission medium such as a coaxial cable, fiber optic line or free space, is configured to transmit the composite signal to a remotely located receiver system.

DETAILED DESCRIPTION

In the following detailed description and in the several figures of the drawing, like elements are identified with like reference numerals. The figures are not to scale, and relative feature sizes may be exaggerated for illustrative purposes.

An exemplary embodiment of an active channelized antenna system may provide a capability to receive a signal with any polarization over a wideband spectrum, e.g. over a microwave/millimeter wave spectrum, amplify the signal without introducing significant harmonics, and retransmitting the full band signal to a remote location from the antenna system.

Figure 1:
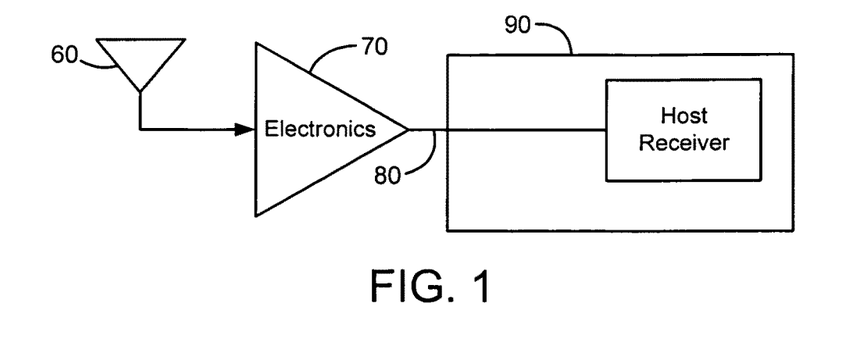
FIG. 1 is a simplified schematic diagram of an exemplary embodiment of an antenna and receiver system.

FIG. 1 is a simplified schematic of an exemplary embodiment of an active antenna system 50. The system includes an antenna system 60 connected to an active electronics module 70. In an exemplary embodiment, the antenna system 60 is in close proximity to the electronics module 70. The electronics module 70 in turn is connected through a cable 80 to a host receiver 90. The receiver 90 may be some distance from the module 70. In one application, the antenna system 60 and electronics module 70 may be positioned at an aircraft wingtip or a rear vertical stabilizer, and the host receiver may be located in the aircraft fuselage.

Figure 2A:
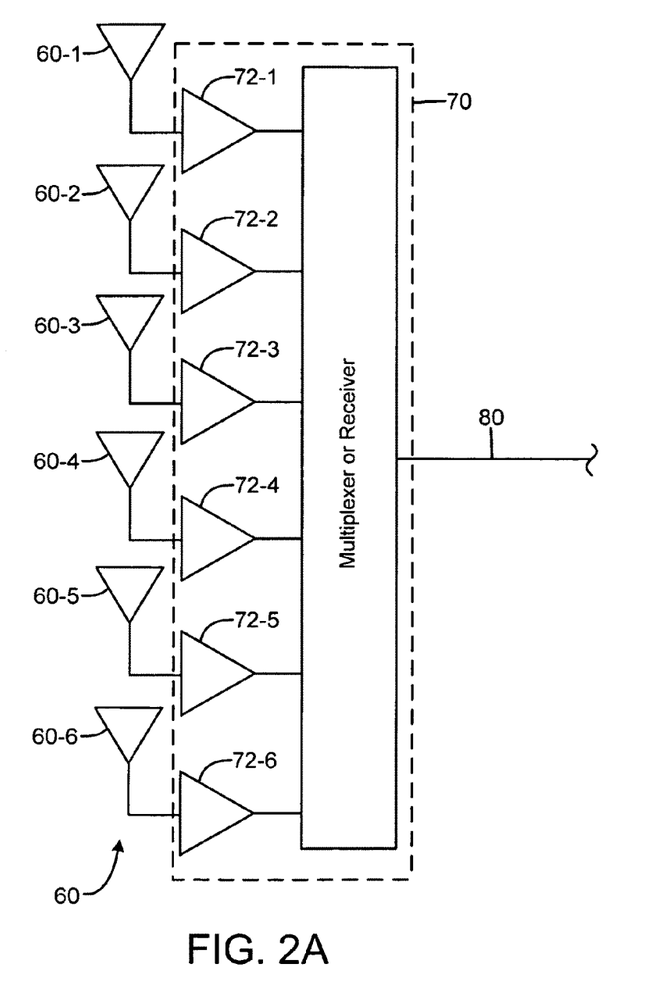
FIG. 2A is a schematic diagram illustrating an exemplary embodiment of an antenna and preamplifier system for the system of FIG. 1.

FIG. 2A illustrates an exemplary embodiment of the antenna system 60 and electronics module 70. In this example, the antenna system includes antennas 60-1, 60-2, . . . 60-6. The antenna system and electronics module 70 may have highly selective characteristics which "channelize" the frequency bands before being passed to the host receiver, in a manner analogous to bandpass filtering. For example, the selectivity of the antennas in an exemplary embodiment may be the result of surrounding one antenna by another. In another embodiment, the antennas may be tuned or designed to respond only to frequencies within its pass band. For example, antenna 60-1 may have an operating band of 1 to 1.8 GHz, antenna 60-2 an operating band of 1.8 GHz to 3.4 GHz, antenna 60-3 an operating band of 3.4 to 6.4 GHz, antenna 60-4 an operating band of 6.4 GHz to 12.4 GHz, antenna 60-5 an operating band of 12.4 GHz to 22 GHz and antenna 60-6 with an operating band of 22 GHz to 40 GHz. These particular frequency bands to which the antennas are tuned represent one exemplary embodiment; other embodiments may employ antennas tuned for selective operation in different frequency bands than these bands. Other embodiments may employ more or less antennas than the antennas depicted in FIG. 2. In other embodiments, the channelization of the frequency bands may be achieved by characteristics of the electronics module 70. Still referring to FIG. 2A, the electronics module 70 in this embodiment may include an amplifier such as low noise amplifiers 72-1, 72-2, . . . 72-6 connected to each respective antenna, and a multiplexer or receiver 74 which is connected between the amplifiers and the cable 80. For this embodiment, the respective low noise amplifiers have less than an octave bandwidth to prevent generation of harmonics within the corresponding pass bands.

Figure 2B:
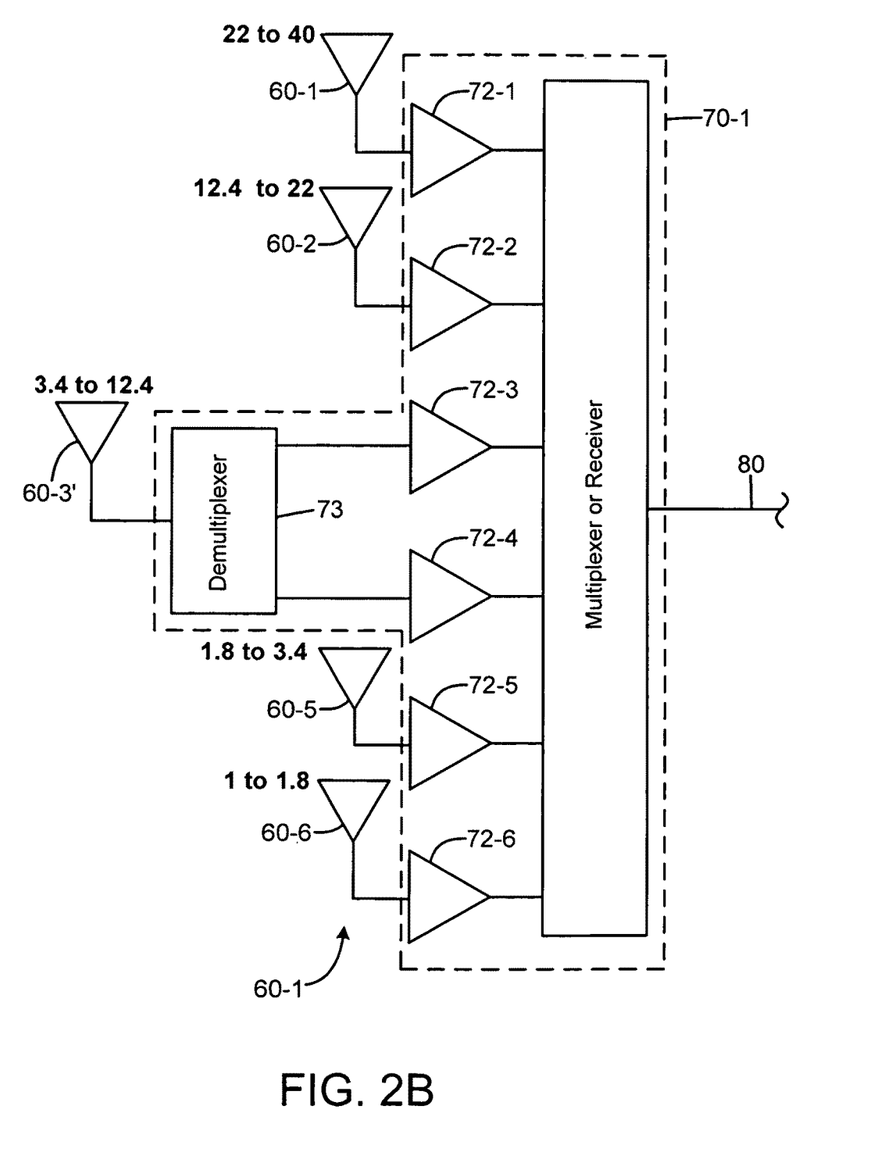
FIG. 2B is a schematic diagram illustrating a further exemplary embodiment of an antenna and preamplifier system for the system of FIG. 1.

FIG. 2B illustrates an alternate exemplary embodiment of an antenna system 60-1 and electronics module 70-1. In this example, the antenna system includes antennas 60-1, 60-2 and 60-5, 60-6 as with the embodiment of FIG. 2. However, antenna 60-3' has an operating band of 3.4 GHz to 12.4 GHz, is connected to a demultiplexer 73, which in turn creates band breaks and divides the received signals into two frequency band components which are amplified by amplifiers 72-3, 72-4. The two band components, for this example, may be a first band component at 3.4 GHz to 6.4 GHz amplified by amplifier 72-3 and a second band component at 6.4 GHz to 12.4 GHz. The band breaks may be created by filters with fast rolloffs for out-of-band signals.

Figure 3:
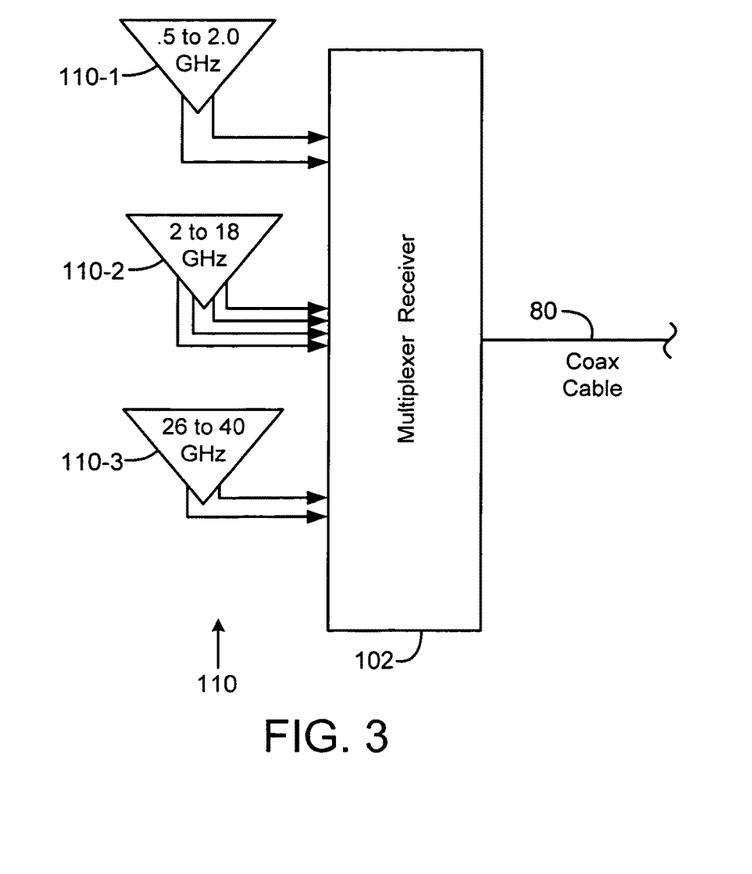
FIG. 3 is a schematic diagram of a further exemplary embodiment of the antenna and receiver system of FIG. 1.
Figure 4:
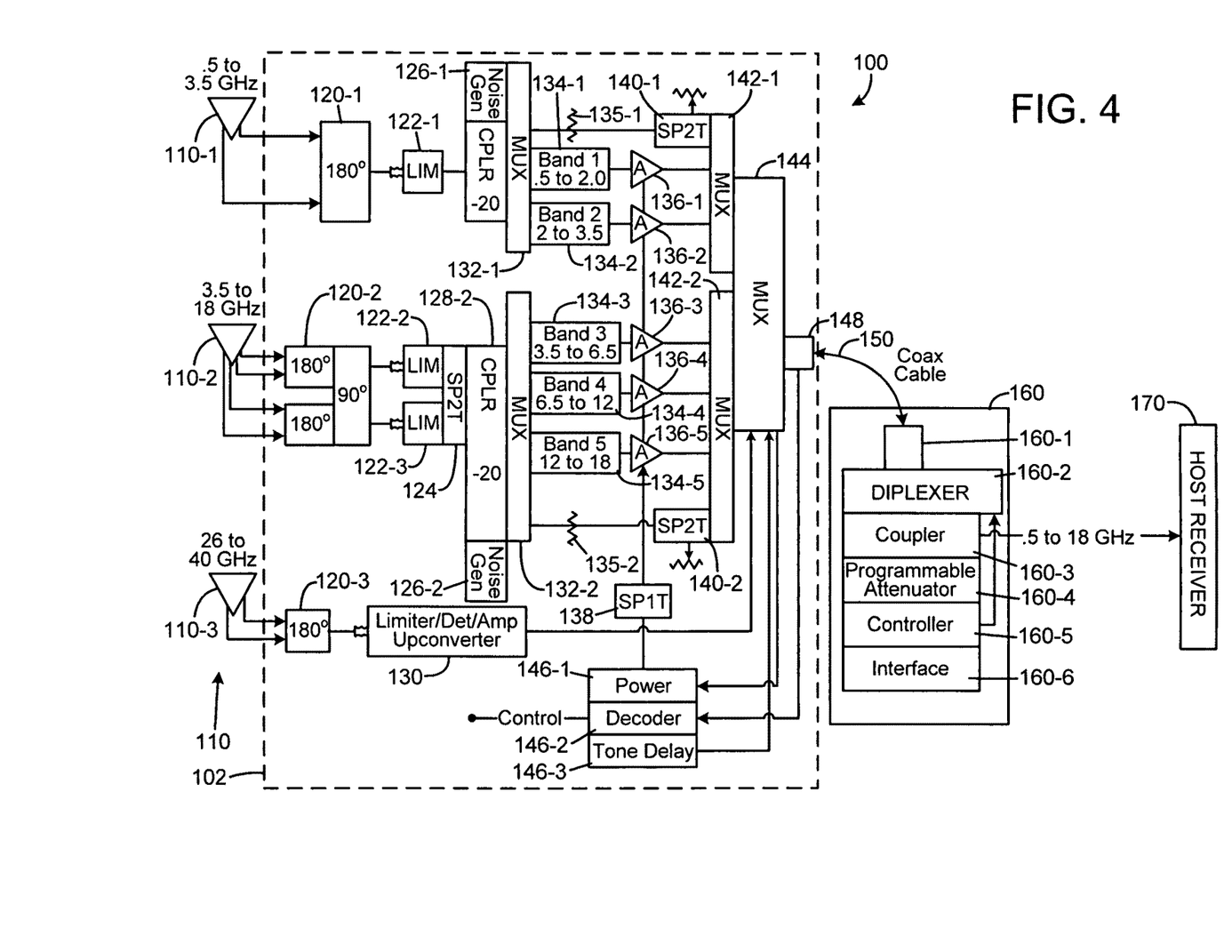
FIG. 4 is a diagrammatic view illustrating an exemplary embodiment of an antenna and receiver system.
Figure 6:
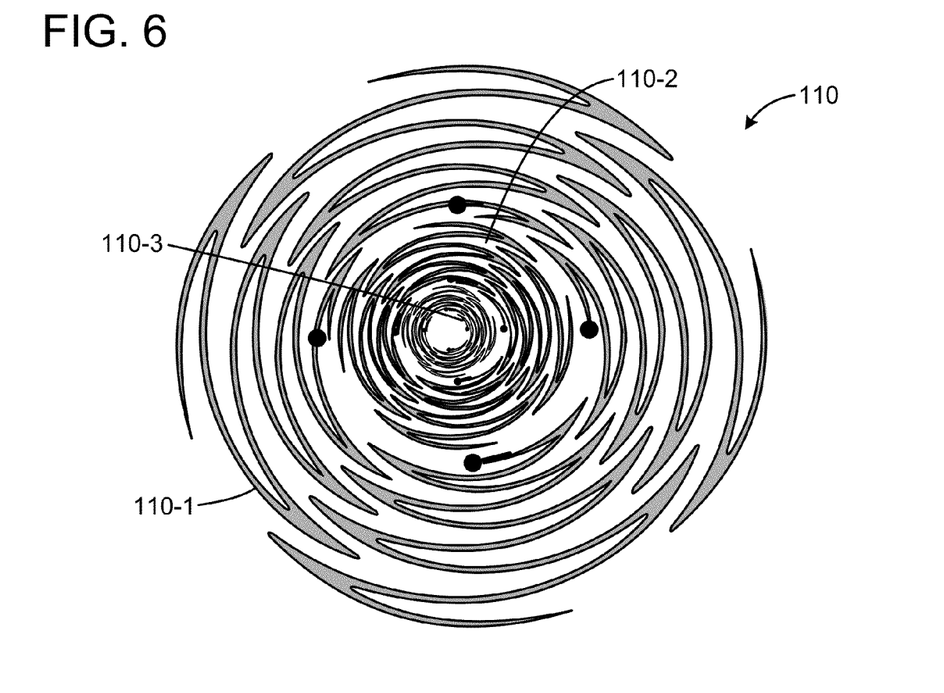
FIG. 6 is a diagrammatic depiction of an exemplary embodiment of an antenna system suitable for the system of FIG. 4.
Figure 7:
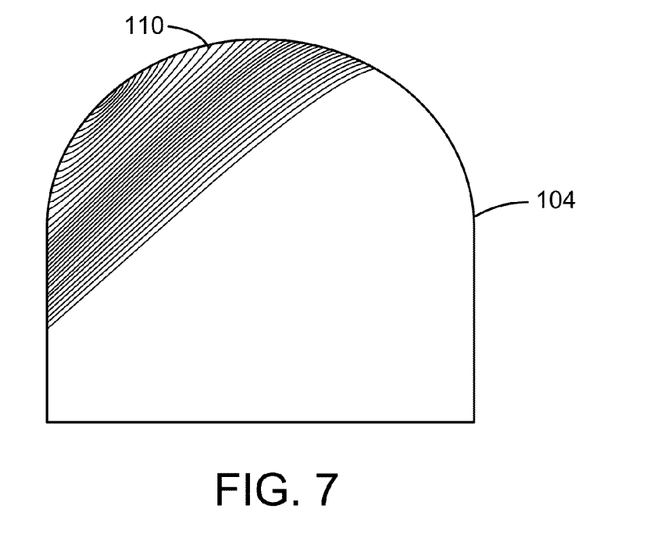
FIG. 7 is a front view of a radome housing carrying an embodiment of the antenna system depicted in FIG. 6.

FIG. 3 schematically illustrates another embodiment of an active channelized antenna system 100. In this embodiment, an antenna array 100 includes antennas 110-1, 110-2, and 110-3. FIG. 6 illustrates an exemplary segmented aperture providing these antennas. For example, antennas 110-1 and 110-3 may be implemented as single polarization spiral antennas, and antenna 110-2 as a dual linear or circular polarization sinuous antenna. Exemplary operating bands for antennas 110-1, 110-2 and 110-3 are 0.5 to 2.0 GHz, 2.0 to 18 GHz and 26-40 GHz, respectively The antennas 110-1, 110-2 and 110-3 are located proximate to an electronics module 102, sometimes referred to as a remote preamplifier, whose components are illustrated in FIG. 4. In an exemplary application, the antennas may be conformal to a radome structure mounted on an aircraft, as illustrated in FIG. 7, and the electronics module 102 housed within the radome structure. The electronics module 102 is connected, in this exemplary embodiment, by a coaxial cable 150 to a remote preamplifier controller 160 which is connected to the host receiver 170. In other embodiments, the transmission medium between the remote preamplifier and the remote preamplifier control may be a fiber optic link, free space, or other wideband transmission media.

Antenna 110-1 in this example is a two port spiral antenna, and its ports are connected to a two-port 180° balun 120-1, which serves to make the currents symmetrical on the spiral. Its output is connected to limiter 122-1 and to a coupler 128-1. The coupled path and straight through path of the coupler are provided to triplexer or multiplexer 132-1, as is an output from a noise generator 126-1. The multiplexer 132-1 splits the incoming signals from the antenna 110-1 into two signals components 134-1 and 134-2, one for band 1 (0.5 GHz to 2.0 GHz), and one for band 2 (2 GHz to 3.5 GHz). The channelized band output signals 134-1 and 134-2 are amplified by respective amplifiers 136-1 and 136-2, and passed to triplexer or multiplexer 142-1. The noise generator output may be passed through the multiplexer 142-1, attenuated and connected to single pole double throw (SP2T) switch 140-1, which either connects the noise signal to a load or to the triplexer or multiplexer 142-1. The multiplexer 142-1 combines the signal components from the SPST switch 140-1 and the amplifiers 136-1 and 136-2 into a composite signal which is in turn coupled to an input port of a triplexer or triplexer 144. The signal from the noise generator 126-1 is also passed through the multiplexer 134-1 and divided into the two band components. The noise generators may generate wideband noise signals when the system is operated in a calibration mode, to enable system calibration of the frequency response.

The respective ports of the antenna 110-2 are coupled to four port balun 120-2, which converts the dual linear polarization signals to respective left and right hand circular polarization signals applied to limiters 122-2 and 122-4. The circular polarization signals are applied to respective limiters 122-2 and 122-3, whose outputs are connected to switch 124. The switch provides the function of selecting either the left hand polarized or the right hand polarized signal to the coupler/switch 128-2, which in turn allows selection of either a coupled (−20 dB) or a straight through path to the multiplexer 132-2, as is an output from a noise generator 126-2. The multiplexer divides the incoming signal into four components 134-3 (3.5 GHz to 6.5 GHz), 134-4 (6.5 GHz to 12 GHz) and 134-5 (, bands 3-5 and a component passed through an attenuator 135-2 to SP2T switch 140-2. The channelized band output signals are amplified by respective amplifiers 136-3, 136-4 and 136-5, and passed to multiplexer 142-2. The noise generator output may be passed by the multiplexer 132-2, attenuated by attenuator 135-2 and connected to single pole double throw (SP2T) switch 140-2, which either connects the noise signal to a load or to the multiplexer 142-2 during the calibration mode. The multiplexer 142-2 combines the signal components from SPST switch 140-2 and amplifiers 136-3, 136-4 and 136-5 into a composite signal which is in turn coupled to a second input port of triplexer 144. The multiplexer 142-2 combines the outputs of each less-than-octave band, after amplification, back into the original full input band. The multiplexer 142-2 is designed to provide sharp rolloff of the out-of-band response for each of the less-than-octave bands, and to the control the phase at the crossover such that the signals there do not cancel. The result is a near perfect replication of the input band frequency response which is amplified. The combining performed by the multiplexer 142-2 is band-matched to the individual sub-octave bands such that there is no interference, i.e. the multiplexer is configured to pass the exact sub-octave band frequencies to pass and rejects frequencies out-of-band.

The ports of antenna 110-3 are connected to two-port balun 120-3. In this exemplary embodiment, the antenna 110-3 is a millimeter wave antenna, e.g. responsive to energy in a band between 26 to 40 GHz. The balun output is connected to a millimeter wave limiter/detector/amplifier/upconverter 130, providing an RF detected video signal to triplexer 144. In an exemplary embodiment, the RF detected output video signal can be sent directly to the multiplexer 144, or upconverted to a higher frequency band, e.g. between about 0.5 GHz and about 2 GHz.

Still referring to FIG. 3, the outputs ports of the triplexer 142-1 and multiplexer 142-2 are connected to input ports of triplexer or multiplexer 144, along with the detected output signal from the antenna 110-3. The multiplexer 144 combines the three inputs into a composite signal, containing signal components representative of signals received at the three antennas 110-1, 110-2 and 110-3, to be passed through bias tee 148 to the connected end of coaxial cable 150.

Also located locally with the antennas is a power supply 146-1 which is powered using low frequency sine wave signals passed through the cable 150 and the bias tee 148, a control tone decoder 146-2 which receives control tones passed through the cable 150 to the triplexer 144, and a tone delay line 146-3 which acts to return the delayed tones to the cable 150. The low frequency sine wave signal is rectified and filtered to produce DC power.

The distal end of the cable 150 is in turn connected to a remote preamplifier controller system 160. The controller system 160 includes a bias tee 160-1, a diplexer 160-2 connected to the bias tee, a coupler 160-3, a programmable attenuator 160-4, a remote receiver controller 160-5 and receiver interface 160-6. An output of the coupler, with signals in the frequency range of antennas 110-1 and 110-2, is passed to the host receiver 170. The remote receiver controller 160-5 generates the control tones which are passed through the cable to the remote preamplifier 102, where they are decoded into commands for controlling the preamplifier 102 including the various switches.

Figure 5A:
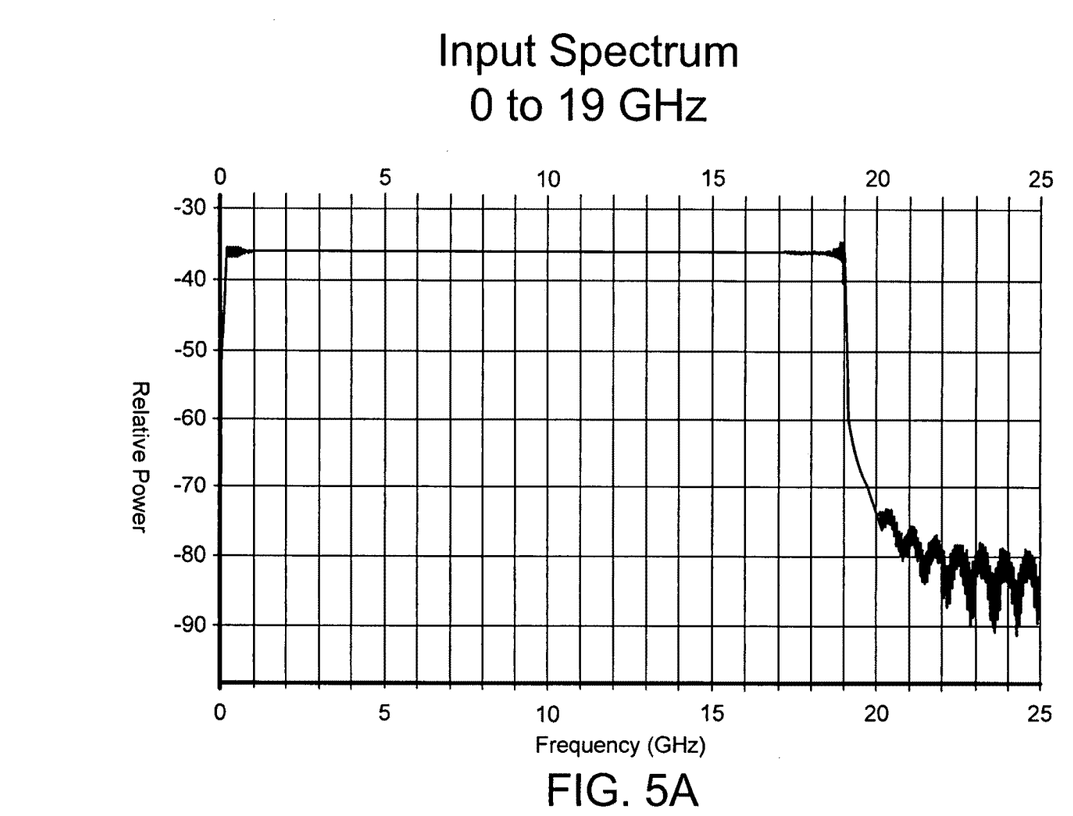
FIG. 5A is a graphical representation of an exemplary input spectrum to the system of FIG. 4.
Figure 5B:
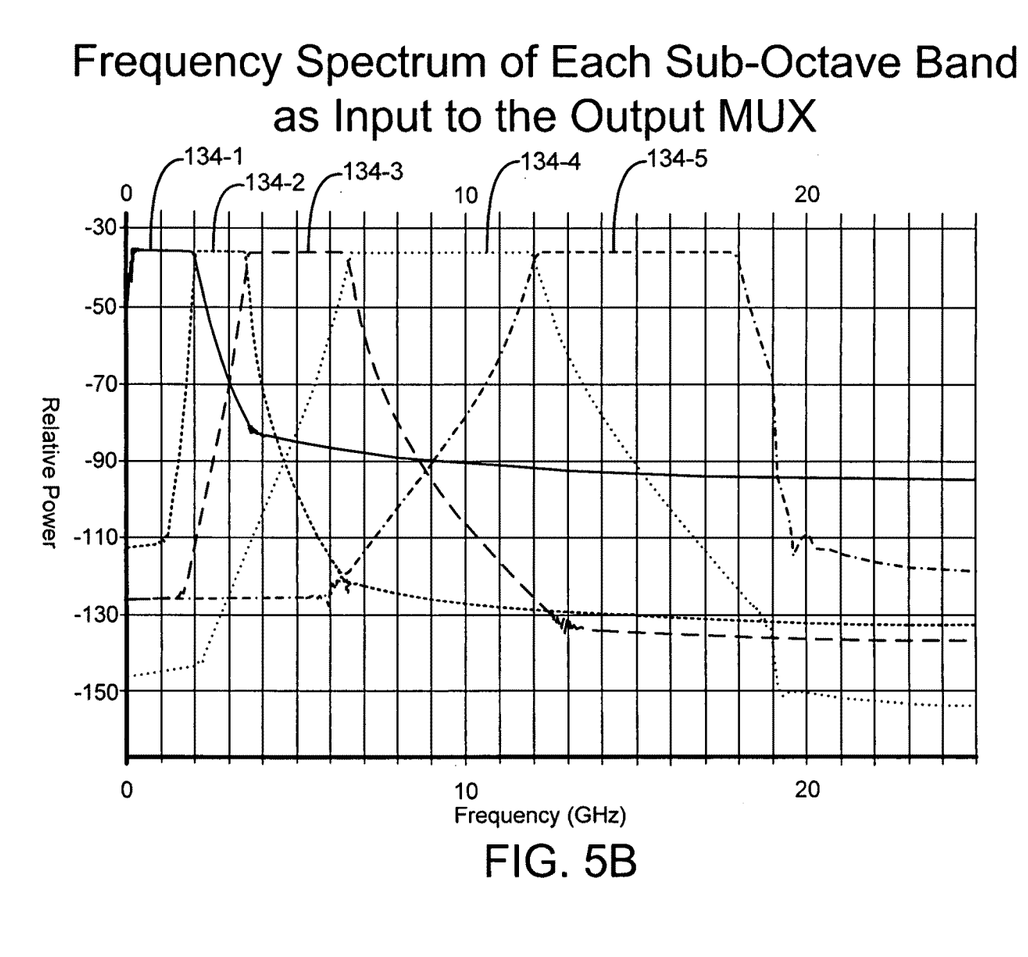
FIG. 5B is a graphical representation of an exemplary frequency band channelization of the exemplary embodiment of FIG. 4.
Figure 5C:
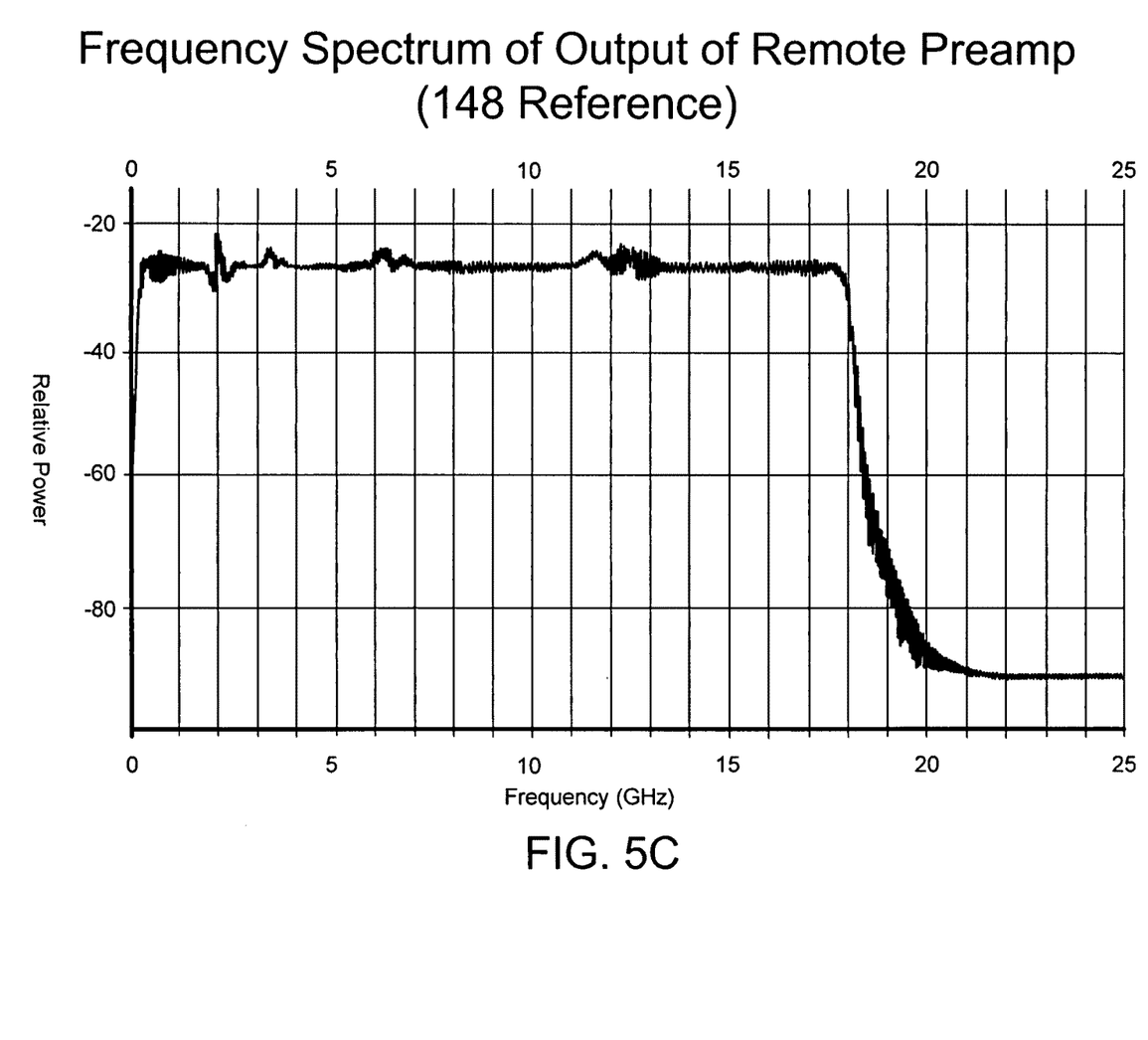
FIG. 5C is a graphical representation of an exemplary output spectrum from the preamplifier system of FIG. 4.
Figure 5D:
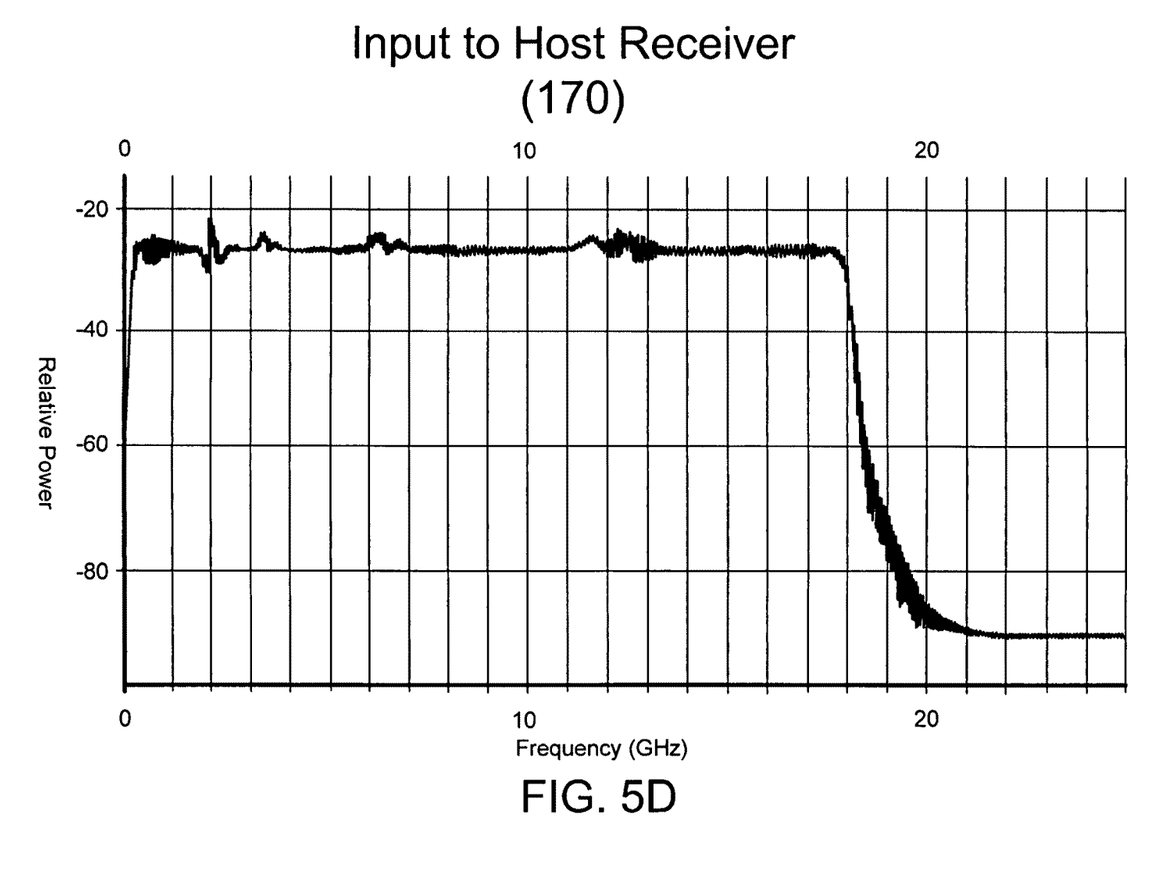
FIG. 5D is a graphical representation of an exemplary input spectrum to the host receiver of FIG. 4.

FIGS. 5A-5D are graphical plots illustrative of frequency band channelization performed by an exemplary embodiment of an active channelized antenna system. FIG. 5A depicts an input power spectrum, indicating a wideband spectrum from 0 Hz to 19 GHz. Thus, the signals at the antenna signal may be in this wideband spectrum for this example. FIG. 5B graphically illustrates the channelization characteristics reflected at the outputs of multiplexers 132-1 and 132-2 (FIG. 4), i.e. of outputs 134-1, 134-2, 134-3, 134-4 and 134-5. These outputs are spectrally limited to the less than octave bandwidths reflected in the response characteristics illustrated in FIG. 5B. FIG. 5C illustrates an exemplary spectral band of the reconstituted, or composite, signal which has been combined by multiplexers 142-1, 142-2 and 144, and output at the bias tee 148 (FIG. 4). FIG. 5D illustrates an exemplary spectral band of the signal re-transmitted through the coaxial cable 150 to the bias tee 160-1 of the remote amplifier controller 160 (FIG. 4).

FIG. 6 depicts an exemplary embodiment of a segmented antenna aperture 110, which may implement antennas 110-1, 110-2 and 110-3. The aperture 110 may be any combination of sinuous and spiral antennas with enough aperture to radiate effectively. A sinuous antenna has four-port excitation, and a spiral antenna may have two-port excitation. In the exemplary embodiment of FIG. 4, the antennas 110-1 and 110-3 are implemented as spiral antennas with single circular polarization, and the antenna 110-2 as a sinuous antenna with dual circular polarization. The antennas may be excited from inside ports, or from outside ports.

FIG. 7 illustrates an exemplary implementation of the antenna aperture 110, fabricated on a printed circuit conformal to a hemispherical radome surface 104. The radome may enclose the electronics module 102 (FIG. 2). In an exemplary embodiment, the bandwidths of the respective antennas 110-1 and 110-2 match the less-than-an-octave bandwidths of the preamplifiers 136-1 ... 136-5, resulting in no harmonics over the frequency range over which these amplifiers operate. In an exemplary embodiment, the antennas are most efficient when their diameters are close to a wavelength (slightly less than free space wavelength). So the diameter of the inside antenna is designed for the highest frequency, and the diameter of the outer antenna has a diameter corresponding to a wavelength at the lowest frequency.

Figure 8:
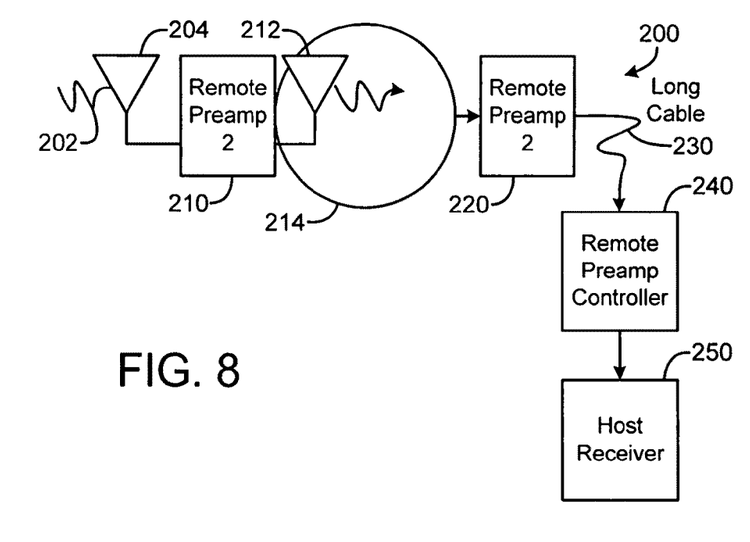
FIGS. 8, 9A-9B and 10A-10B illustrate respective exemplary embodiments of wideband repeater systems.

A system having features similar to those described above with respect to FIG. 4 can be configured to act as a wideband repeater with appropriate modifications. FIG. 8A illustrates an exemplary embodiment of a repeater system 200. The system includes an input module including a first remote preamplifier 210, which receives wideband signals 202 with antenna 204. The first remote preamplifier 210 then transmits signals to a second module including a second remote preamplifier 220 over a transmission media 214, which may be a fiber optic media, free space optics or free space RF, using the media-appropriate transmit and receive elements, e.g. wideband antenna 212 for RF. The preamplifier may include a power amplifier, if needed, depending on the loss of the transmission medium 214. The second preamplifier 220 is connected to a remote preamplifier controller 240 by a long cable 230. The controller 240 is connected to the host receiver 250. In this example, the preamplifiers 210 and 220 are analogous to remote preamplifier 102 of FIG. 4, except that the control signals are transmitted in the frequency range of the system for demultiplexing and decoding by the remote preamplifiers.

Figure 9A:
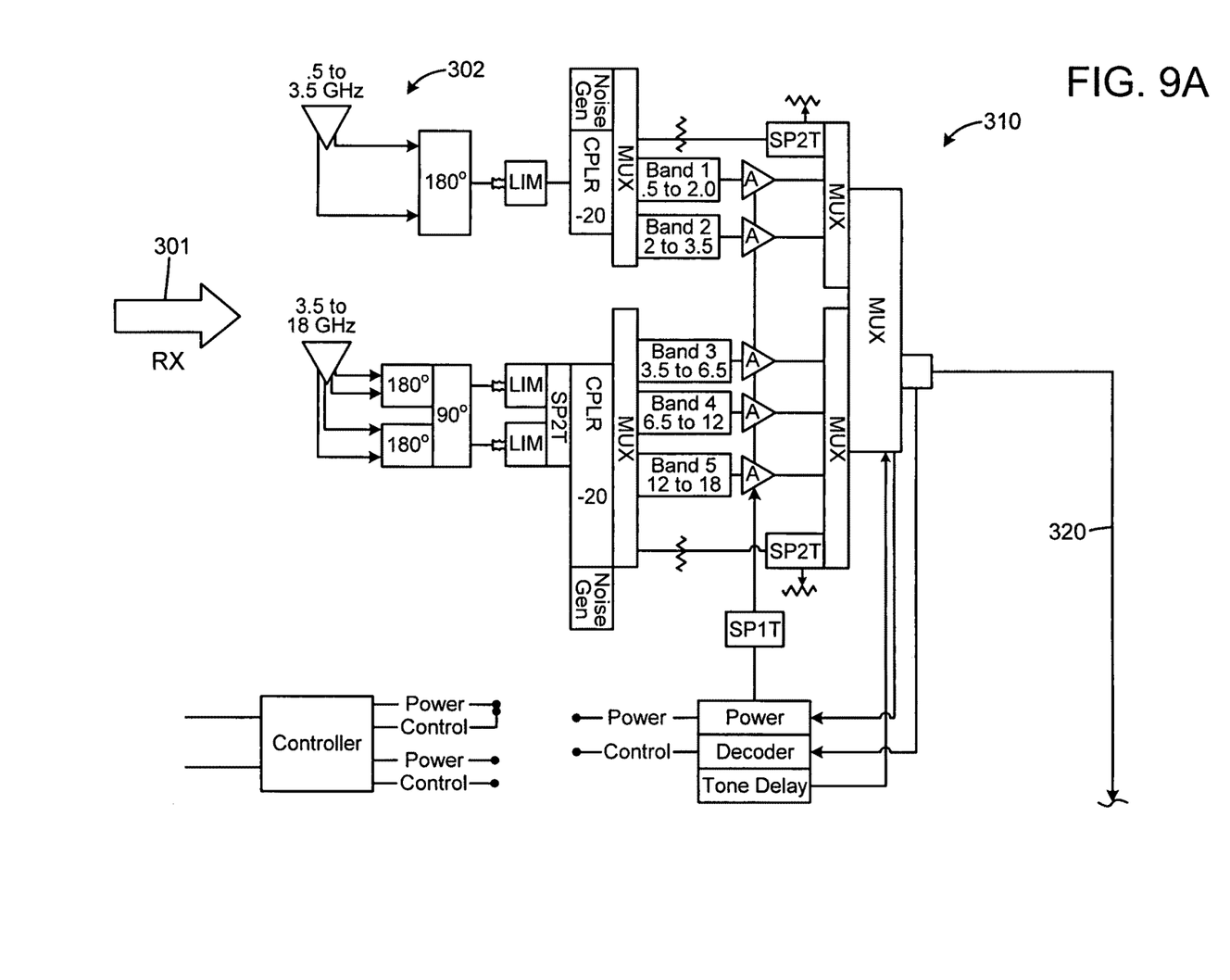
Figure 9B:
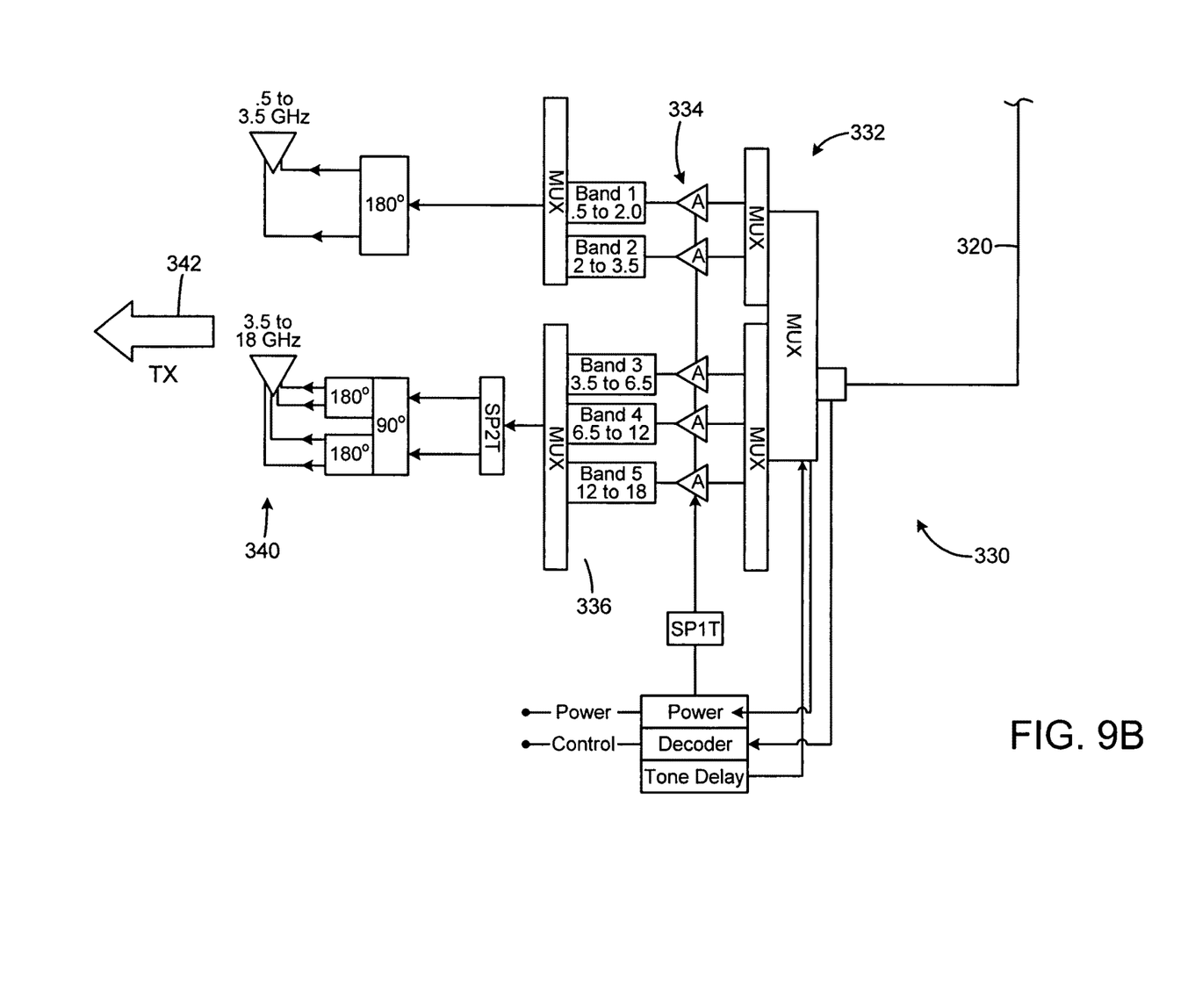

FIGS. 9A-9B and 10A-10B are schematic diagrams illustrating respective alternate exemplary embodiments of repeater systems. The system illustrated in FIGS. 9A-9B is a repeater system with an input module 310 (FIG. 9A), an output module 330 (FIG. 9B), connected by a transmission medium 320 such as a coaxial cable 320. The input module 310 includes an antenna array similar to antennas 110-1 and 110-2 of FIG. 4 for receiving wideband signals 301, and an electronics module similar to module 102 of FIG. 4, excluding the circuit elements for the 26-40 GHz channel. Thus, the input module 310 includes an input antenna array 302 operable over a multi-octave frequency band to provide input antenna received signals over an input signal spectrum, in this example over a frequency band between 0.5 GHz and 18 GHz. The input module electronics module includes multiplexer circuitry responsive to the antenna output signals configured to divide the input signal spectrum in the multi-octave frequency band into a plurality of frequency band components each of less than an octave bandwidth. The electronics module includes a plurality of low-noise amplifiers each of less than an octave bandwidth to provide an amplified component signal for a respective frequency band, and input module combiner circuitry for combining the amplified frequency band components into an input composite signal transmitted over the transmission medium 320, in this example a coaxial cable, to the output module 330.

Referring now to FIG. 9B, the output module 330 includes output module divider circuitry 332 for dividing the transmitted input composite signal received through the transmission medium 320 into a plurality of frequency band signal components each of less than an octave bandwidth. The electronics module includes a plurality of power amplifiers 334 each of less than an octave bandwidth to provide an amplified component signal for a respective frequency band. The output module further includes multiplexer circuitry 336 responsive to the plurality of frequency band signal components to combine the signal components into an output signal spectrum. An output antenna array 340 is operable over the multi-octave frequency band and is responsive to the output signal spectrum to provide output antenna transmitted signals 342 in the output signal spectrum. The output signal spectrum is a replica of the input signal spectrum.

The system of FIGS. 9A-9B may include a single controller, or separate controllers for the input module 310 and the output module 330. The controller(s) performs several functions. The primary function distributes the appropriate power and control signals to the preamplifiers (input module) and to the transmitter amplifiers (output module). Secondarily, the controller(s) may attenuate signals, dependent on the losses of the transmission medium.

Figure 10A:
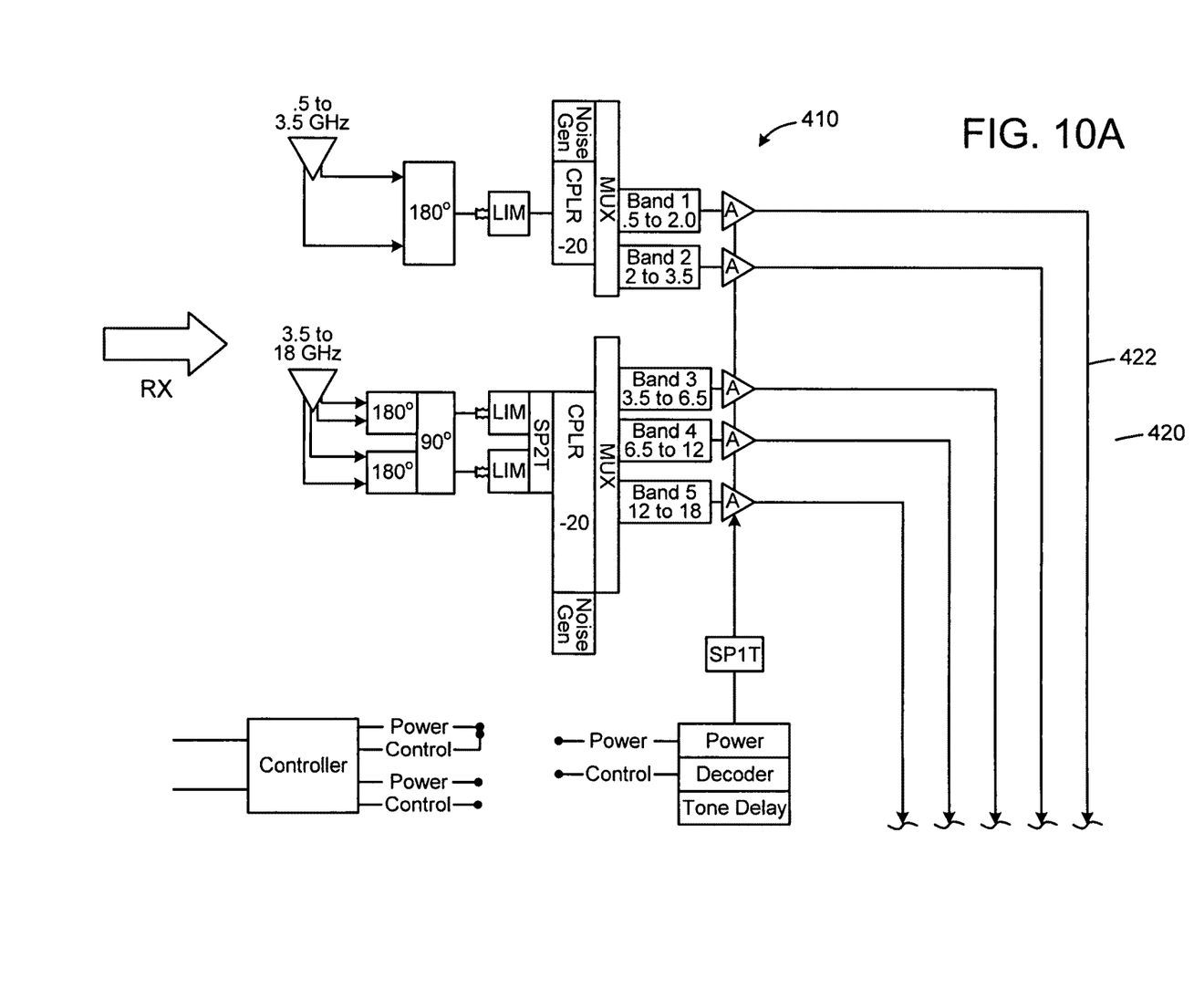
Figure 10B:
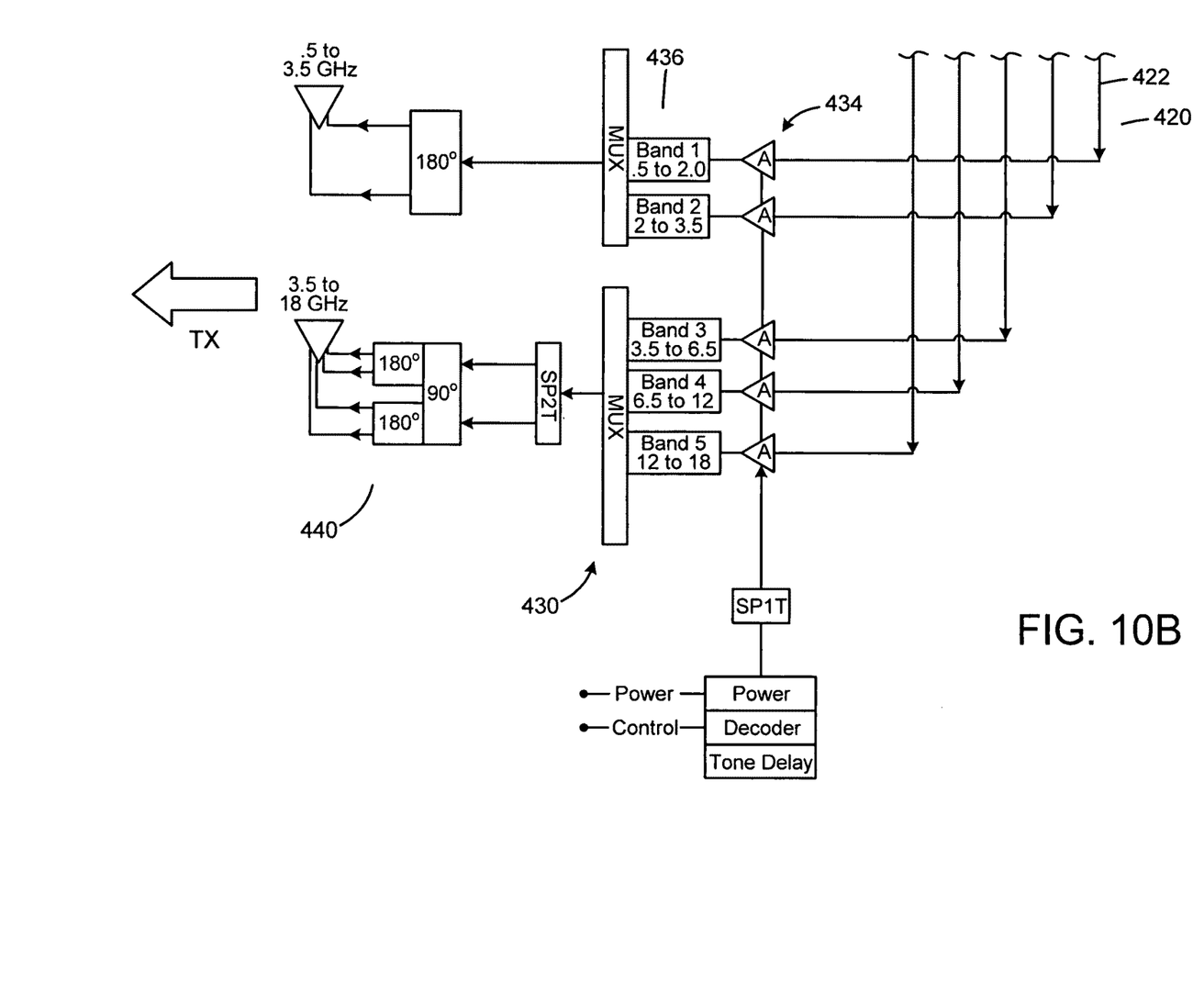

The exemplary repeater system shown in FIGS. 10A-10B is configured such that the input module 410 (FIG. 10A) and the output module 430 (FIG. 10B) are relatively close to each other, and direct connection is made between respective sub-band channels in a transmission circuit 420, which may include respective coaxial cables, and may include power amplifiers (not shown in FIG. 10A). For example, the output of a first sub-band channel is connected through cable 422 to the corresponding sub-band channel input of the output module 430. As with the embodiment of FIGS. 9A-9B, the output module includes power amplifiers 434, combiner circuitry 436 and an output antenna array 440. The combiner circuitry is responsive to the plurality of frequency band signal components to combine the signal components into an output signal spectrum. The output antenna array 440 is operable over the multi-octave frequency band and is responsive to the output signal spectrum to provide output antenna transmitted signals in the output signal spectrum. The output signal spectrum is a replica of the input signal spectrum. Coaxial cables for each sub-band may be preferable as a transmission medium if the output module is only a short distance away from the input module. This distance prevents the output signal from re-entering the receive antenna preventing ring-around phenomenon common to repeaters. This may be appropriate to the problem of transmission around-the-corner of a building where direct line-of-sight is not possible.

Although the foregoing has been a description and illustration of specific embodiments of the subject matter, various modifications and changes thereto can be made by persons skilled in the art without departing from the scope and spirit of the invention as defined by the following claims.

What is claimed is:

1. An active channelized antenna system comprising:
an antenna array operable over a multi-octave frequency band of an input signal spectrum to provide one or more antenna output signals;
an electronics module comprising:
a plurality of baluns coupled to the one or more antenna output signals, respectively,
a plurality of limiters each coupled to an output of a respective balun,
a plurality of random noise generators,
a plurality of multiplexers each coupled to an output of a respective limiter and a respective random noise generator and configured to divide an input signal spectrum in said multi-octave frequency band into a plurality of channelized frequency band components each of less than an octave bandwidth, and
a plurality of amplifiers each of less than an octave bandwidth to provide an amplified component signal for a respective frequency band;
combiner circuitry for combining the amplified frequency band components into a composite signal which replicates the input signal spectrum; and
a transmission medium for transmitting the composite signal to a remotely located receiver system.

2. The system of claim 1, wherein the transmission medium includes a coaxial cable.

3. The system of claim 1, wherein the antenna array comprises a dual polarization sinuous antenna, providing a first antenna output of a first polarization sense and a second antenna output of a second polarization sense.

4. The system of claim 3, wherein said electronics module comprising a switch circuit for selecting either said first antenna output or said second antenna output for input to said multiplexer circuitry.

5. The system of claim 3, wherein the antenna array further includes a spiral antenna.

6. The system of claim 5, wherein said sinuous antenna and said spiral antenna are fabricated on a dielectric radome structure mounted on an aircraft.

7. The system of claim 1, wherein said combiner circuitry is band-matched to each of said less than an octave bandwidths such that there is no interference.

8. The system of claim 1, wherein said multi-octave band includes a frequency range from 3.5 GHz to 18 GHz.

9. The system of claim 8, wherein said frequency band components each of less than an octave bandwidth includes a first band component at a frequency band between about 3.5 GHz and about 6.5 GHz, a second band component at a frequency band between about 6.5 GHz and 12 GHz, and a third band component at a frequency band between about 12 GHz and 18 GHz.

10. The system of claim 1, wherein the plurality of amplifiers includes a plurality of low noise amplifiers.

* * * * *